United States Patent
Stachniak

(10) Patent No.: US 10,197,139 B2
(45) Date of Patent: Feb. 5, 2019

(54) LINEAR ACTUATOR WITH SELECTIVE DISENGAGEMENT

(71) Applicant: Darryl S. Stachniak, Chicago, IL (US)

(72) Inventor: Darryl S. Stachniak, Chicago, IL (US)

(73) Assignee: Woodward, Inc., Fort Collins, CO (US)

( * ) Notice: Subject to any disclaimer, the term of this patent is extended or adjusted under 35 U.S.C. 154(b) by 402 days.

(21) Appl. No.: 15/170,604

(22) Filed: Jun. 1, 2016

(65) Prior Publication Data
US 2017/0350480 A1    Dec. 7, 2017

(51) Int. Cl.
F16H 25/00    (2006.01)
F16H 25/20    (2006.01)
F16H 35/18    (2006.01)

(52) U.S. Cl.
CPC ......... F16H 25/2025 (2013.01); F16H 35/18 (2013.01)

(58) Field of Classification Search
CPC ............................. F16H 25/2025; F16H 35/18
USPC ...... 74/724, 424.71, 424.75, 424.78, 424.94, 74/424.95
See application file for complete search history.

(56) References Cited

U.S. PATENT DOCUMENTS

| | | | | |
|---|---|---|---|---|
| 3,492,886 A * | 2/1970 | Naureckas | ............ | B25B 1/125 |
| | | | | 74/424.78 |
| 3,669,440 A | 6/1972 | Kartasuk et al. | | |
| 3,757,591 A * | 9/1973 | Taylor | ..................... | F16H 25/20 |
| | | | | 74/424.78 |
| 4,176,561 A * | 12/1979 | Davidson | ............... | D05B 35/00 |
| | | | | 74/424.95 |
| 4,274,294 A * | 6/1981 | Siryj | ................... | F16H 25/2009 |
| | | | | 74/424.95 |
| 5,101,679 A | 4/1992 | Smith et al. | | |
| 5,676,019 A * | 10/1997 | Shenk | ..................... | F16H 25/24 |
| | | | | 74/424.95 |
| 6,142,447 A | 11/2000 | Jean-Luc et al. | | |
| 6,516,680 B1 * | 2/2003 | Nakamura | ........... | B62D 5/0445 |
| | | | | 74/424.72 |
| 8,967,006 B2 * | 3/2015 | Pettersson | ................ | A47B 9/04 |
| | | | | 74/424.95 |
| 2007/0295128 A1 * | 12/2007 | Erikson | .................. | D04B 21/04 |
| | | | | 74/89.42 |
| 2013/0299631 A1 * | 11/2013 | Tucker | .................... | B64C 25/26 |
| | | | | 74/424.71 |
| 2016/0105075 A1 * | 4/2016 | Wu | ........................ | H02K 7/102 |
| | | | | 310/77 |

* cited by examiner

*Primary Examiner* — Victor L MacArthur
(74) *Attorney, Agent, or Firm* — Reinhart Boerner Van Deuren P.C.

(57) ABSTRACT

An actuator is provided. The actuator includes a housing and a ram linearly movable relative to the housing. The ram is selectively mechanically coupled to a drive screw of the actuator such that in one configuration, the ram is decoupled from the drive screw to allow it to linearly move independently from rotation of the drive screw.

20 Claims, 8 Drawing Sheets

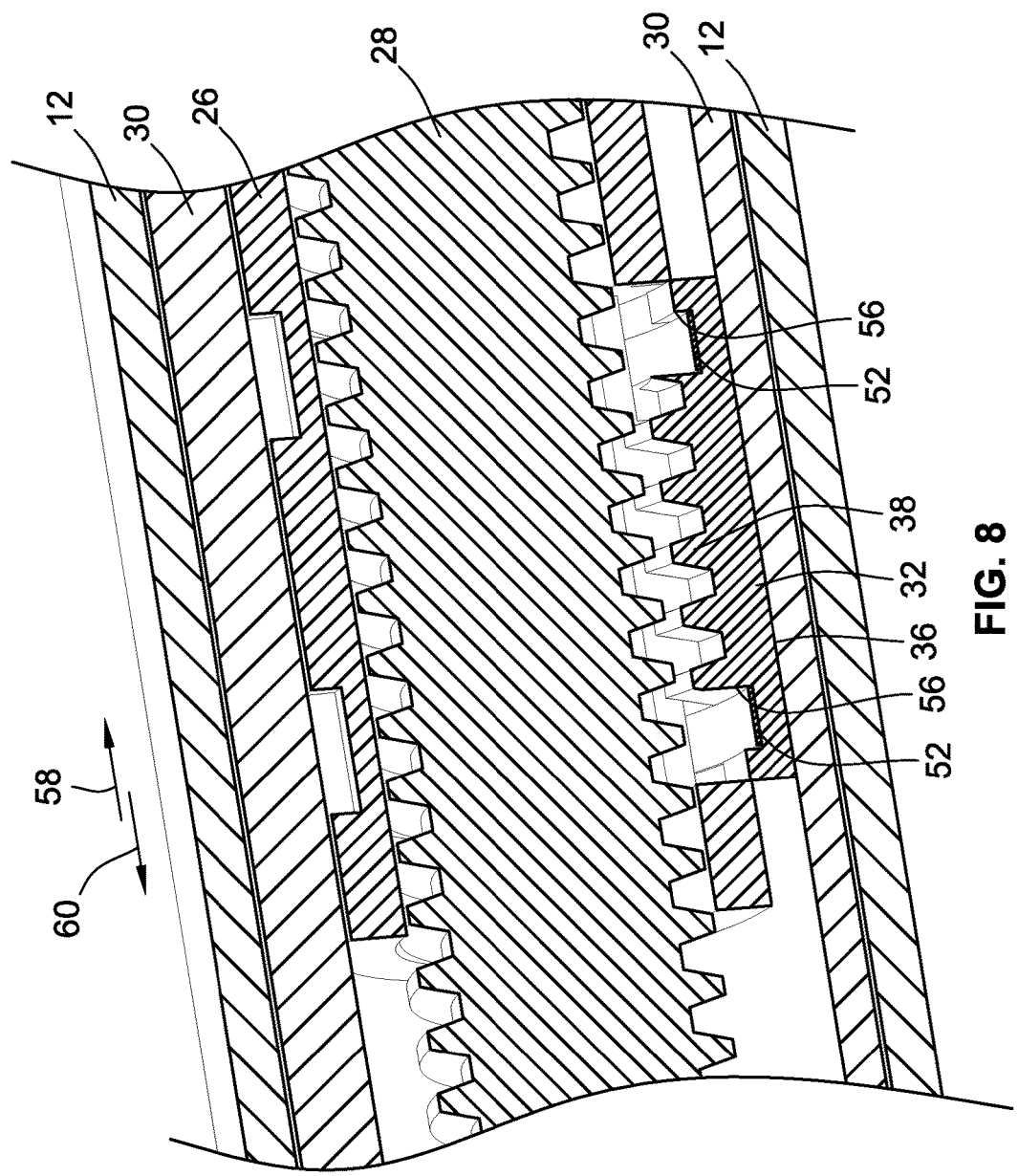

LINEAR ACTUATOR WITH SELECTIVE DISENGAGEMENT

FIELD OF THE INVENTION

This invention generally relates to actuators, and more particularly to linear actuators which employ a screw to transfer a rotational input to a linear output.

BACKGROUND OF THE INVENTION

Linear actuators which employ a screw arrangement having a drive screw and a drive nut are used in a variety of applications to transfer a rotational input to a linear output. As one example, a linear actuator may be used in an aircraft to move a control surface, e.g. an aileron, of the aircraft to a desired orientation in order to manipulate flight dynamics.

As is readily understood, a motor or other device provides a rotational input, i.e. an input torque, to rotate the drive screw of the linear actuator. A ram of the linear actuator is in threaded engagement with the drive screw via the drive nut. The ram is mechanically constrained from rotating with the drive screw by the use of a keyway or similar configuration. As a result, as the drive screw rotates, the ram moves linearly as a result of the aforementioned constraint. This linear output of the actuator is used to adjust a position of the control surface in this exemplary application.

Due to the employment of a screw arrangement, the linear actuator is highly efficient in holding the desired position of the control surface with minimal, if any, input holding power. Indeed, once in a desired position, the control surface will hold its orientation with minimal to no input holding power because it is very difficult to release or disengage a linear actuator which employs a screw arrangement. This capability is due in large part to the low lead angle of the threads of the drive screw and the drive nut.

Unfortunately, there may be instances where it is desirable to release or disengage the linear actuator. For example, and still referring to the example of a control surface above, if the input drive device, such as a motor, connected to the linear actuator fails and cannot return the control surface to a neutral position, the control surface must be biased back to its neutral position by an external input. This biasing operation requires releasing or disengaging the linear actuator. However, as stated above, it is very difficult to release or disengage a linear actuator which employs a screw. In such circumstances, the control surface thus becomes jammed in a certain orientation.

There have been attempts to construct a linear actuator which employs a screw arrangement that can be released or disengaged. Such systems employ various mechanisms for selectively disengaging the ram from the drive screw so that the ram may be freely moved without the resistance created by the screw. See for example U.S. Pat. No. 3,669,440 to Kartasuk et al. titled Quick Engaging and Disengaging Nut Mechanism; U.S. Pat. No. 6,142,447 to Jean-Luc et al. titled Translation Block with Disengaging Nut for Screw Mounted Lifting Mechanism; and U.S. Pat. No. 5,101,679 to Smith et al. titled Screw Drive Engagement/Disengagement and Decoupling Mechanism, the teachings and disclosures of each of which are incorporated by reference herein in their entireties.

However, as can be seen from the aforementioned patents, the mechanisms required to permit such back driving are relatively complex and have a high part count. Further, such designs result in a non-symmetrical loading on the drive screw by the mechanisms which are used to selectively disengage the ram from the screw.

Accordingly, there is a need in the art for a linear actuator which, while employing a screw arrangement, may still be released or disengaged as needed without relying on a complex disengaging mechanism and without non-symmetrical loading on the drive screw. The invention provides such a linear actuator. These and other advantages of the invention, as well as additional inventive features, will be apparent from the description of the invention provided herein.

BRIEF SUMMARY OF THE INVENTION

In one aspect, the invention provides an actuator which advantageously provides a reduced part count, low weight, lower power input disengagement arrangement for disengaging one or more drive nuts from a drive screw. An embodiment of an actuator according to this aspect includes a housing defining a longitudinal axis. A sleeve is rotatably mounted within the housing. The sleeve defines a bore therethrough. A drive screw is also rotatably mounted within the housing. The drive screw is disposed within the bore of the sleeve. A ram is linearly movable within the bore of the sleeve. The ram includes a ram body and at least one drive nut mounted on the ram body. The at least one drive nut is arranged on the ram body for threaded engagement with the drive screw. Rotation of the sleeve in a first rotational direction disengages the at least one drive nut from the drive screw.

In an embodiment according to this aspect, the actuator also includes a first input drive device. The first input drive device is mechanically coupled to the drive screw to rotate the drive screw about the longitudinal axis. The actuator also includes a second input drive device, The second input drive device is mechanically coupled to the sleeve to rotate the sleeve about the longitudinal axis, independently from rotation of the drive screw. The sleeve has a radially inner facing cam surface. The at least one drive nut has a radially outer facing cam surface. The radially inner facing surface and the radially outer facing surface are in slidable contact with one another.

In an embodiment according to this aspect, the least one drive nut includes a plurality of drive nuts. The plurality of drive nuts are mounted to the ram body equally spaced from one another. Each drive nut of the plurality of drive nuts has a first side and a second side. The radially outer facing surface is disposed on the first side, and the second side is threaded. Each one of the plurality of drive nuts is biased against the radially inner facing cam surface of the sleeve by a biasing element. The biasing element may take the form of one or more leaf springs in one embodiment.

The ram includes at least one keyway formed on an exterior of the ram body. The housing includes at least one key. The at least one key is received by the at least one keyway.

In another aspect, the invention provides an actuator with a selective disengagement arrangement which utilizes opposed contacting cam surfaces. An embodiment according to this aspect includes a housing defining a longitudinal axis. The actuator also includes a sleeve rotatably mounted within the housing. The sleeve defines a bore therethrough. A drive screw is rotatably mounted within the housing. The drive screw is disposed within the bore of the sleeve. A ram is linearly movable within the bore of the sleeve. The ram includes a ram body and at least one drive nut mounted on the ram body. The at least one drive nut is arranged on the ram body for threaded engagement with the drive screw. The at least one drive nut has a radially outer facing cam surface. The sleeve has a radially inner facing cam surface. The radially outer facing cam surface and the radially inner facing cam surface are in slidable contact with one another.

In an embodiment according to this aspect, the actuator also includes a first input drive device. The first input drive device is mechanically coupled to the drive screw to rotate the drive screw about the longitudinal axis. The actuator also includes a second input drive device. The second input drive device is mechanically coupled to the sleeve to rotate the sleeve about the longitudinal axis independently from rotation of the drive screw.

In an embodiment according to this aspect, the at least one drive nut includes a plurality of drive nuts. The plurality of drive nuts are mounted to the ram body equally spaced from one another. Each drive nut of the plurality of drive nuts has a first side and a second side. The radially outer facing surface is disposed on the first side, and wherein the second side is threaded. Each one of the plurality of drive nuts is biased against the radially inner facing cam surface of the sleeve by a biasing element.

In yet another aspect, the invention provides an actuator which can be selectively disengaged as needed in the event of an input drive device failure. An embodiment according to this aspect includes a housing defining a longitudinal axis. The actuator also includes a sleeve rotatably mounted within the housing, the sleeve defining a bore therethrough. A drive screw is rotatably mounted within the housing. The drive screw is disposed within the bore of the sleeve. A ram is linearly movable within the bore of the sleeve. The ram selectively mechanically coupled to the drive screw. The sleeve is rotatable to a first position and a second position. In the first position, the ram is mechanically coupled to the drive screw. In the second position, the ram is disengaged from the drive screw.

In an embodiment according to this aspect, the ram includes a ram body and at least one drive nut mounted thereon. The at least one drive nut mechanically couples the ram to the drive screw. The sleeve has a radially inner facing cam surface. The at least one drive nut has a radially outer facing cam surface. The radially inner facing cam surface and the radially outer facing cam surface are in slidable contact with one another.

In an embodiment according to this aspect, the at least one drive nut includes a plurality of drive nuts. The plurality of drive nuts are mounted to the ram body equally spaced from one another. Each drive nut of the plurality of drive nuts has a first side and a second side. The radially outer facing surface is disposed on the first side, and the second side is threaded. Each one of the plurality of drive nuts is biased against the radially inner facing cam surface of the sleeve by a biasing element. The biasing element may be one or more leaf springs.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 7 and 8 are partial perspective cross sections of the linear actuator of FIG. 1, showing the ram of FIG. 3 disengaged from the drive screw of the linear actuator;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the illustrations, FIGS. 1-8 illustrate an exemplary embodiment of an actuator 10 according to the teachings herein. As will be understood from the following, the invention provides an actuator which, while employing a screw type arrangement, may still be released or disengaged as needed without relying on a complex disengaging mechanism and without the heretofore typical non-symmetrical loading on the screw of prior designs.

Figure 1:
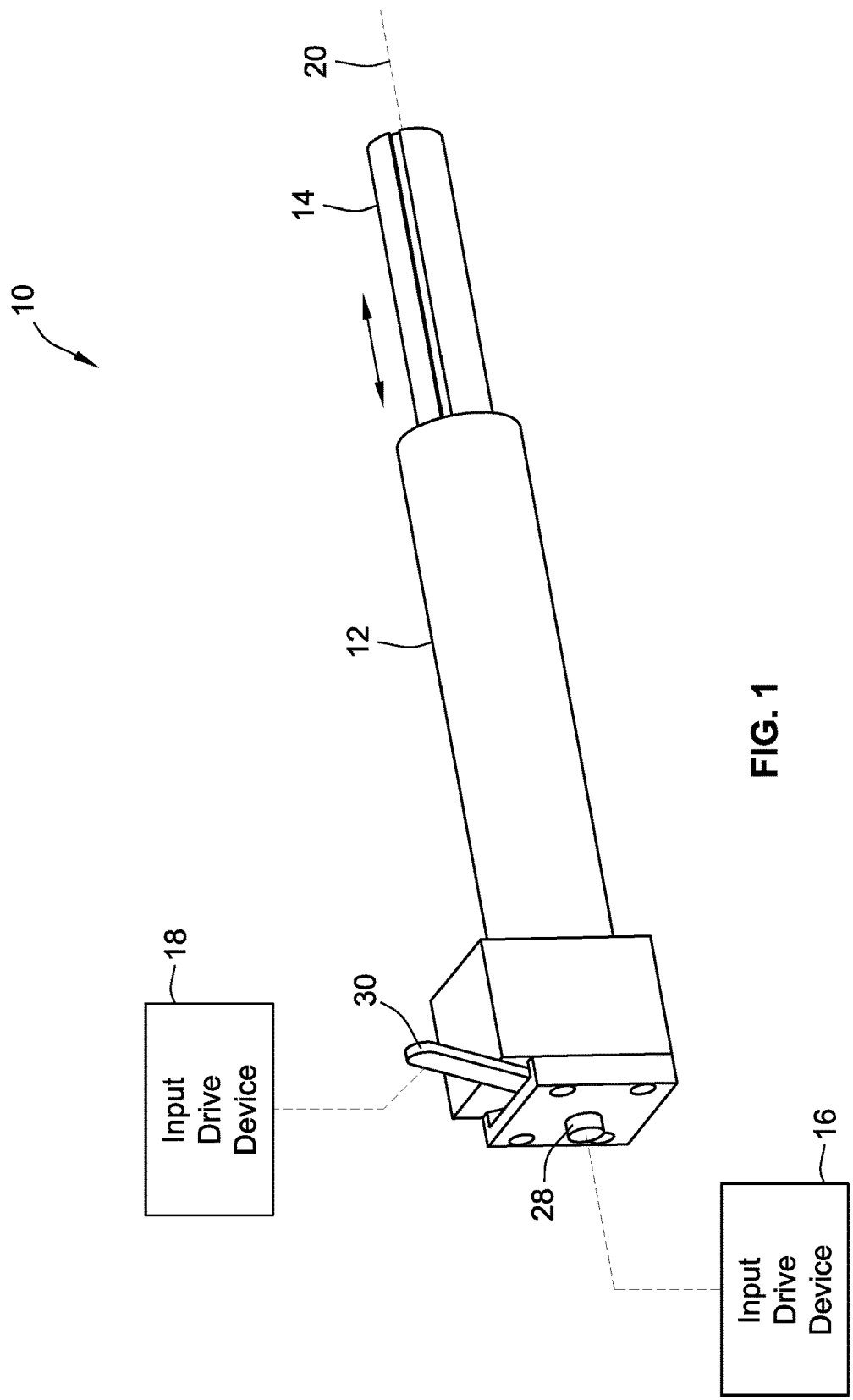
FIG. 1 is a perspective view of one embodiment of a linear actuator according to the teachings of the present invention.

With particular reference now to FIG. 1, actuator 10 is illustrated in a perspective view. Actuator 10 includes an outer housing 12 and a ram 14 which is linearly movable relative to housing 12 along a longitudinal access 20 defined by housing 12. As will be understood from the following, actuator 10 employs a screw type arrangement. An input drive device 16 is coupled to a drive screw 28 of the aforementioned screw arrangement and is operable to rotate the same about longitudinal axis 20. Input drive device 16 may take the form of any known actuator which is configured to provide a rotational output. As non-limiting examples, input drive device 16 may be a pneumatic, hydraulic, or electric device directly or indirectly coupled to drive screw 28. Indeed, input drive device 16 could take the form of an electric motor as one specific non-limiting example.

Another input drive device 18 is coupled to a sleeve 30 of actuator 10. As shown in FIG. 1, sleeve 30 may include an arm which extends from an exterior of housing 12 to provide a linkage for input drive device 18. Input drive device 18 is operable to rotate sleeve about longitudinal access 20 as will be understood from the following. In another embodiment, sleeve 30 may not include any arm extension accessible from an exterior of housing 12. For example, sleeve 30 could include exterior gear teeth or spline features formed thereon for coupling with a drive gear of a motor. Input drive device 18 may also take the form of any known actuator which is configured to provide a rotational output. As non-limiting examples, input drive device 18 may be a pneumatic, hydraulic, or electric device directly or indirectly coupled to sleeve 30. Indeed, input drive device 18 could take the form of an electric motor as one specific non-limiting example.

As will be understood from the following, in the event that input drive device 16 fails, and it is desired to move ram 14 along longitudinal axis 20 relative to housing 12, input drive device 18 rotates sleeve 30 to selectively disengage ram 14 from drive screw 28. Input drive devices 16, 18 are schematically represented as being exterior to housing 12. It is contemplated by the teachings herein that housing 12 may incorporate input drive devices 16, 18 in an interior thereof such that actuator 10 is presented in a single packaged unit. It is also contemplated by the teachings herein that actuator 10 may not include its own input drive devices 16, 18 but instead simply provide connection points to drive screw 28 and sleeve 30 as shown for example in the illustrated embodiment for connection to existing actuation systems.

Figure 2:
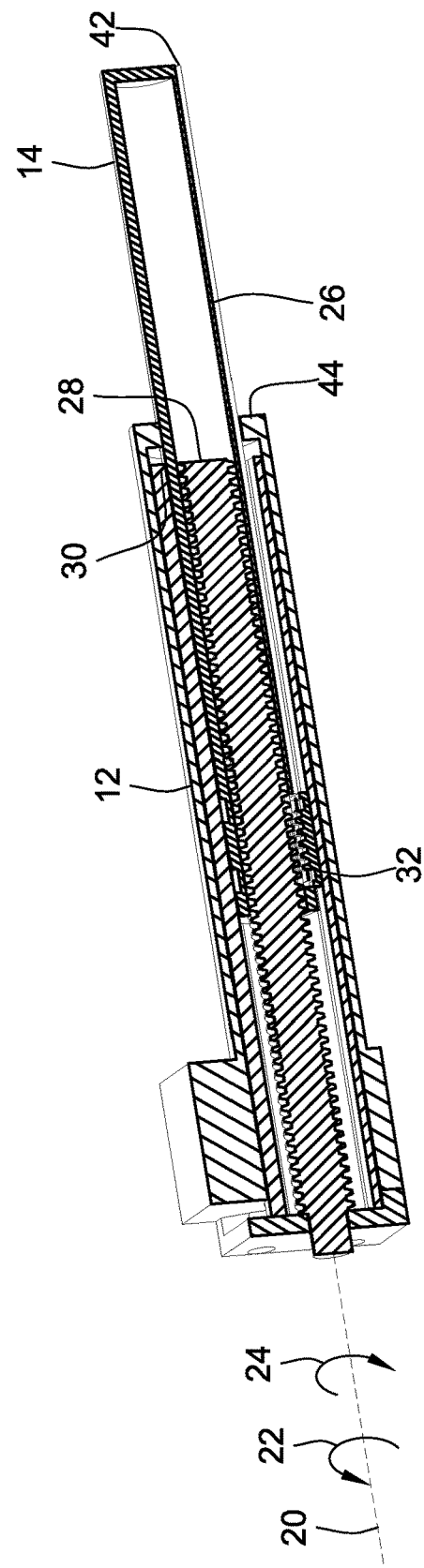
FIG. 2 is a perspective cross section of the linear actuator of FIG. 1.

Turning now to FIG. 2, the above-introduced selective disengagement functionality and structure of actuator 10 will be described in greater detail referring to the cross-section shown. As can be seen in FIG. 2, drive screw 28 is mounted within an exterior of housing 12 and is centered on axis 20. Sleeve 30 is also mounted within an exterior of housing 12 and is also centered on axis 20. Sleeve 30 includes a central bore therethrough which receives drive screw 28 as well as ram 14. Drive screw 28 is rotatable about longitudinal axis 20 in rotational directions 22, 24 via an input from input drive device 16 (See FIG. 1). Sleeve 30 is also rotatable about longitudinal axis 20 in rotational directions 22, 24 by way of an input from input drive device 18 (See FIG. 1). Drive screw 28 and sleeve 30 may be rotationally supported by bearings (not shown) within housing 12 to facilitate the aforementioned rotations.

Ram 14 includes a ram body 26 with at least one drive nut 32 mounted thereon. In the illustrated embodiment, three drive nuts 32 which are equally angularly spaced about ram body 26 are utilized. It is contemplated, however, that fewer or greater drive nuts may be used and their spacing may not be equal. However, it will be recognized that with equal spacing, a symmetrical loading is placed upon drive screw 28 via the threaded engagement between drive nuts 32 and drive screw 28.

Ram body 26 includes one or more keyways 42 which respectively receive keys 44 formed in housing 12. As a result of this keyed arrangement, rotation of drive screw in either of rotational directions 22, 24 about longitudinal axis 20 results in a linear movement of ram 14 given the threaded engagement of ram 14 with drive screw 28 by way of drive nuts 32. However, depending upon the rotational position of sleeve 30 about longitudinal axis 20, drive nuts 32 may be disengaged from drive screw 28. This advantageously allows ram 14 to be freely back-driven in the event of a failure of input drive device 16. (See FIG. 1). Put differently, sleeve 30 is operable to selectively engage and disengage drive nuts 32 from drive screw 28. Disengaging drive nuts 32 from drive screw 28 effectively decouples ram 14 from input drive device 16 so that a failure thereof will not prevent subsequent movement of ram 14.

Figure 3:
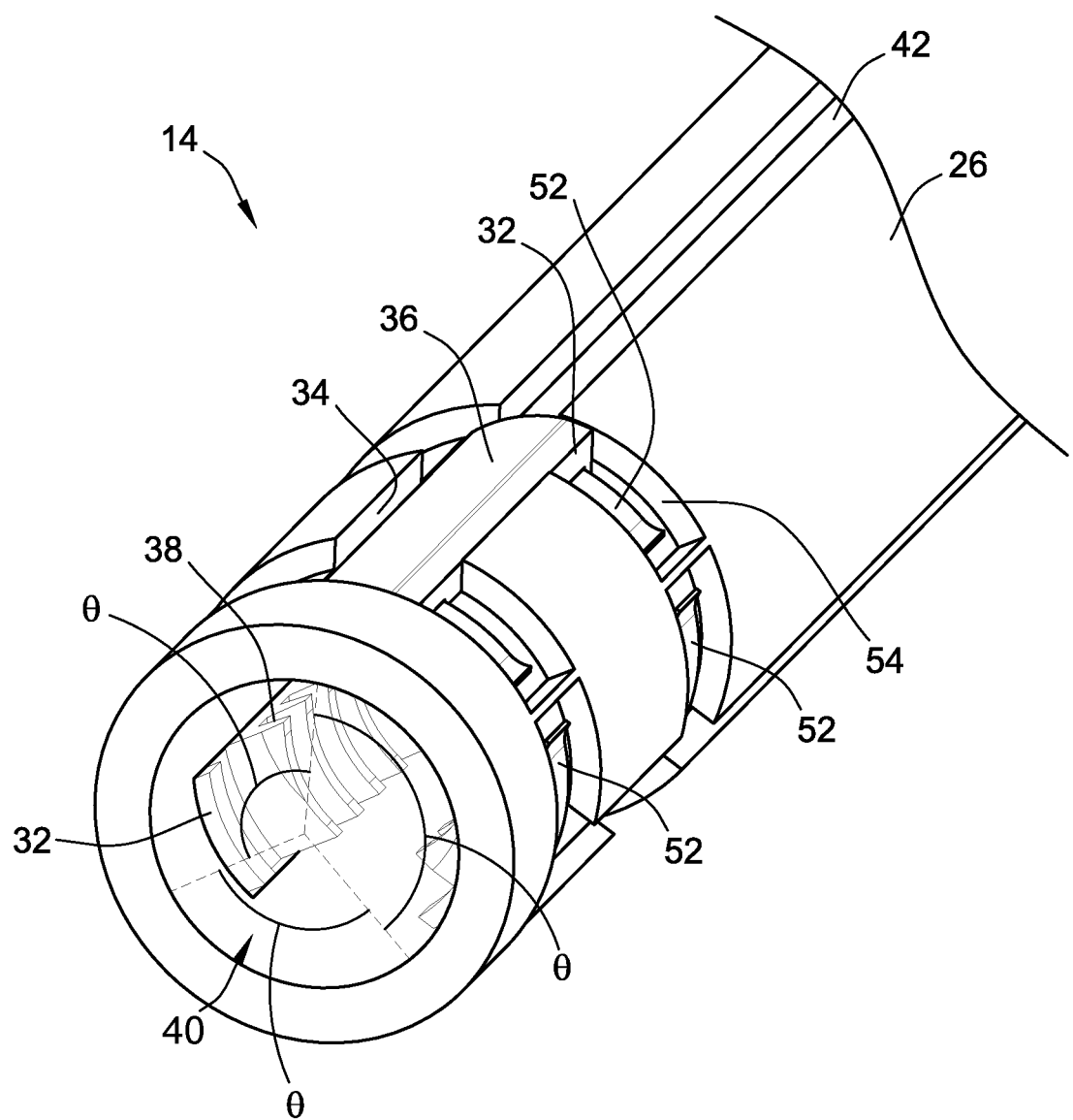
FIG. 3 is a perspective view of a ram of the linear actuator.

Turning now to FIG. 3, the particulars of ram 14 are illustrated in greater detail. Ram body 26 includes a central bore 40 therethrough. As can be surmised from inspection of FIG. 2, this bore 40 receives drive screw 28. Drive nuts 32 are situated within openings 34 formed in ram body 26 as shown. As a result, drive nuts 32 communicate with bore 40 formed in ram body 26. Each drive nut 32 includes a radially outer-facing cam surface 36 which interacts with a radially inner-facing cam surface 46 (See FIG. 5) of sleeve 30. Each drive nut 32 also includes threads 38 formed on a side opposite that of the side of the drive nut 32 including cam surface 36. These threads 38 extend into bore 40 and threadably engage drive screw 28 as shown in FIG. 2. As can be seen in FIG. 3, drive nuts 32 are equally spaced from one another at an angle θ as shown. However, in other embodiments, drive nuts 32 need not be equally spaced.

Figure 4:
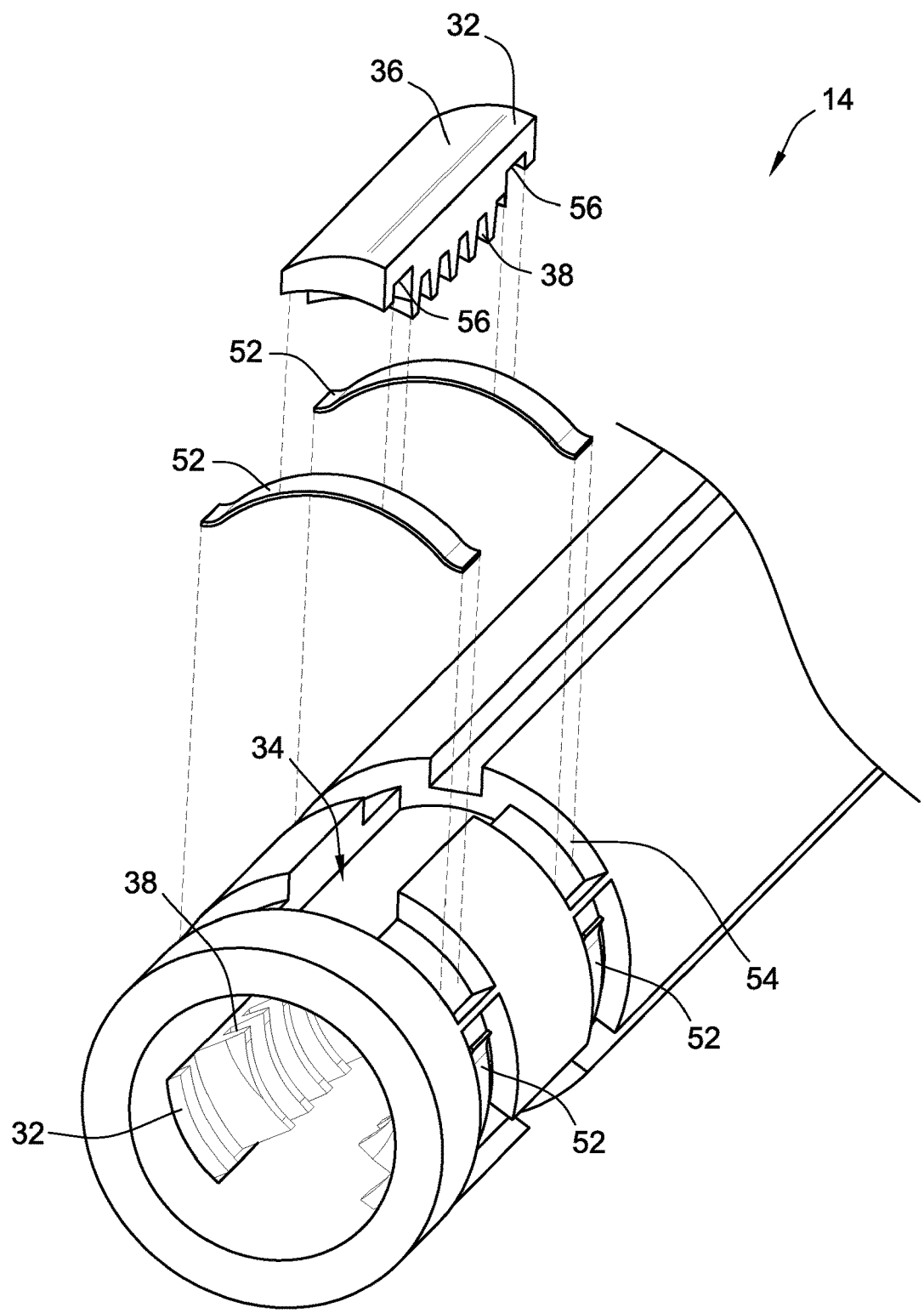
FIG. 4 is an exploded perspective view of the ram of FIG. 3.

Turning now to FIG. 4, each drive nut 32 is biased radially outward of the opening 34 receiving drive nut 32 by one or more leaf springs 52. These leaf springs 52 are received and retained by annular channels 54 formed in ram body 26. Leaf springs 52 are also received in retaining grooves 56 formed in each drive nut 32 as shown. As a result of this configuration, each drive nut 32 is biased radially outward of opening 34 towards sleeve 30. As will be described in greater detail with respect to FIGS. 5-8, each drive nut 32 is biased radially outwardly until its respective cam surface 36 contacts the cam surface 46 of sleeve 30. As such, the presence of sleeve 30 prevents continued radially outward movement of drive nuts 32 relative to openings 34 which receive drive nuts 32.

Figure 5:
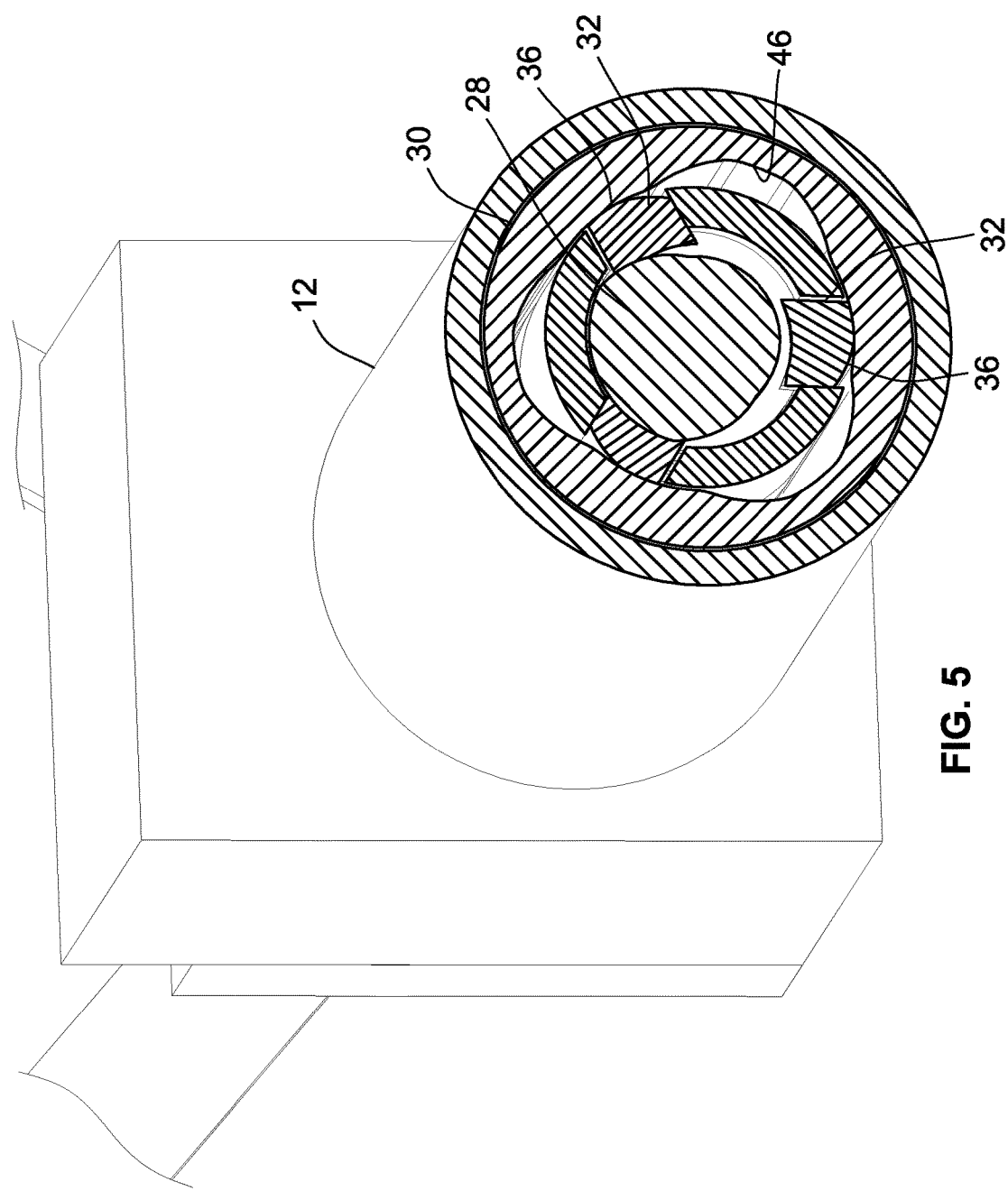
FIGS. 5 and 6 are partial perspective cross sections of the linear actuator of FIG. 1, showing the ram of FIG. 3 engaging a drive screw of the linear actuator.

With reference to FIG. 5, sleeve 30 is shown in a first position where the cam surface 46 thereof interacts with the radially outward-facing cam surface 36 of each drive nut 32 to bias the same against the force provided by leaf springs 52 (See FIG. 4) such that each drive nut 32 is in threaded engagement with drive screw 28. This configuration may be considered to be the normal operating condition of actuator 10. As discussed above, an input torque provided by input drive device 16 to rotate drive screw 28 will result in a linear movement of ram 14 due to the threaded engagement shown in FIG. 5 between drive nuts 32 and drive screw 28, as well as the keyed arrangement formed between key way 42 and keys 44 shown in FIG. 2. As can be seen from inspection of FIG. 5, cam surface 46 is non-cylindrical in shape, and takes on a generally lobed triangular cross sectional shape.

Figure 6:
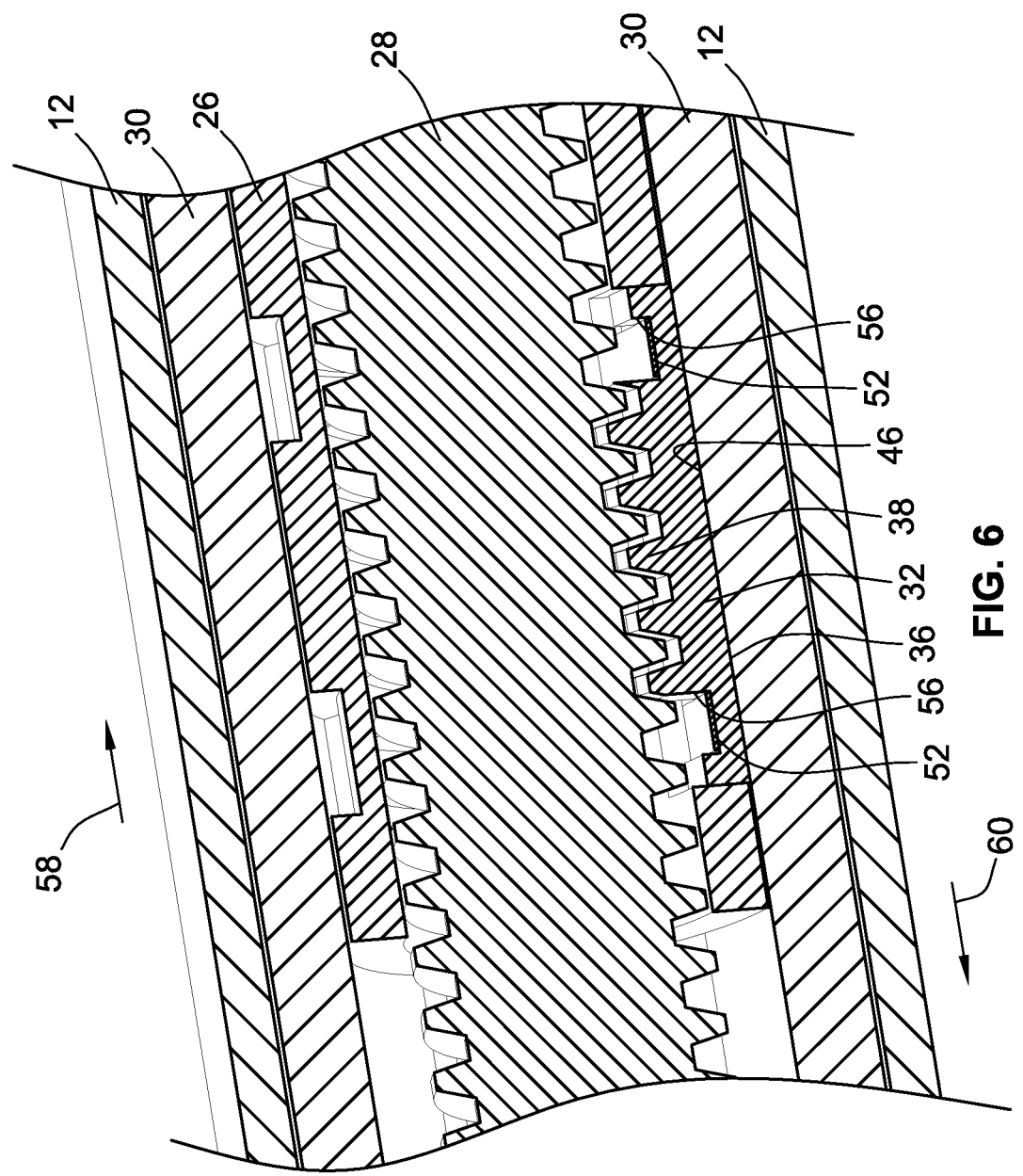

Such linear movement is depicted by linear direction arrows 58, 60 in FIG. 6. It will be recognized, however, that the linear movement of ram 14 in linear directions 58, 60 shown in FIG. 6 is generally only possible by way of the rotation of drive screw 26 as a result of an input from input device 16 (See FIG. 1). It will be recognized, however, that there may be minute linear movement of ram 14 in directions 58, 60 as a result of creep or mechanical vibrations if drive screw 28 is free to rotate unconstrained by input drive device 16, which will be recognized is not a normal operating condition.

Figure 7:
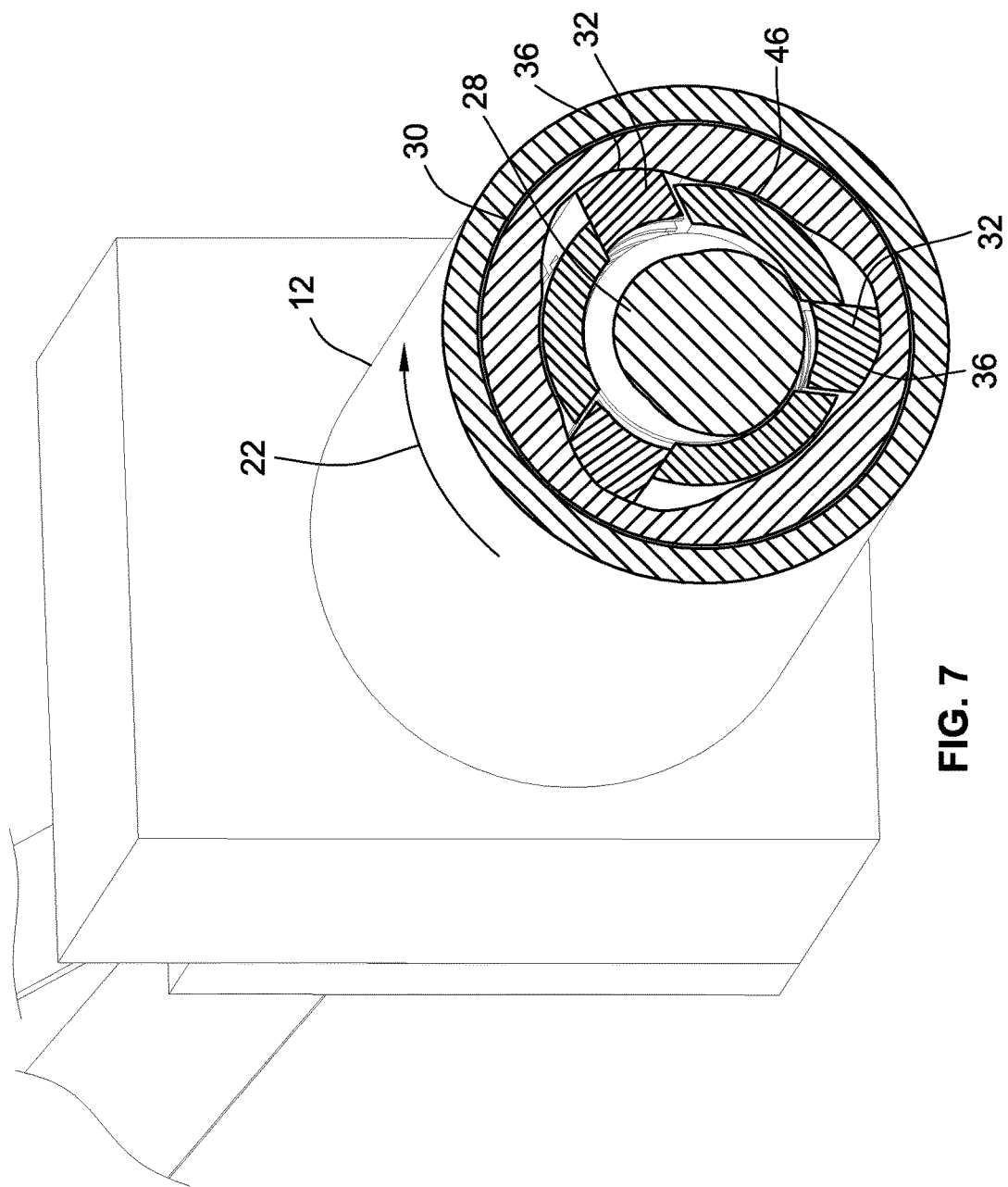

Turning now to FIG. 7, sleeve 30 is now shown rotated in rotational direction 22 to a second position. In this position, cam surface 46 permits drive nuts 32 to move radially outward due to the biasing force provided by leaf springs 52 such that the threads 38 of each drive nut 32 are disengaged from drive screw 28. This disengagement is also shown in FIG. 8. As can be surmised from inspection of FIG. 8, this engagement allows ram 14 to freely move in either of linear directions 58, 60 without any required rotation of drive screw 28. For example, in the event that input drive device 16 fails and it is not possible to rotate drive screw 28, sleeve 30 may be rotated to the second position illustrated in FIGS. 7 and 8 by input drive device 18 (See FIG. 1) to allow an external force to move ram 14 to a desired position. As one of many non-limiting examples, where ram 14 is connected to a control surface of an aircraft, the control surface will be biased by airflow acting against it to an equilibrium position. This biasing will also freely move ram 14 given its mechanical connection to this control surface.

Having described the structural details of one exemplary embodiment of actuator 10, a typical method of operation will be described in the following referring collectively to FIGS. 1-8. In normal operation, sleeve 30 will be positioned in the first rotational position shown in FIG. 5. As a result, an input provided by input drive device 16 to drive screw 28 will rotate drive screw 28 to cause a linear movement of ram 14 into or out of housing 12. As mentioned above, this linear movement is possible due to the threaded engagement of drive nuts 32 with drive screw 28, as well as the rotational constraint of ram 14 made possible by way of keyways 42 and keys 44. Ram 14 is thus linearly movable to a desired linear position relative to housing 12.

However, in the event that a subsequent linear movement of ram 14 is desired, but input drive device 16 has failed and is incapable of providing a rotational input to drive screw 28, input drive device 18 rotates sleeve 30 to the second rotational position shown in FIG. 7. As this rotation occurs, leaf springs 52 continue to bias the radially outer-facing cam surface 36 of each drive nut 32 against radially inner-facing cam surface 46 of sleeve 30. Because of the non-cylindrical surface formed by cam surface 46, drive nuts 32 are permitted to move radially outward relative to drive screw 28 to such an extent that their threads 38 disengage drive screw 28. In this position, ram 14 is then freely movable relative to drive screw 28 in linear directions 58, 60. An exterior force may then act upon ram 14 to move the same accordingly.

Accordingly, the actuator described herein advantageously overcomes problems with existing design by providing a reduced part count system for selectively disengaging a leaf drive nut from a drive screw thereof. Even more advantageously, the actuator can employ multiple drive nuts which are symmetrically arranged about the drive screw such that a symmetrical loading is placed thereof. These and other advantages may be readily surmised from the disclosure herein.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An actuator, comprising:
    a housing defining a longitudinal axis;
    a sleeve rotatably mounted within the housing, the sleeve defining a bore therethrough;
    a drive screw rotatably mounted within the housing, the drive screw disposed within the bore of the sleeve;
    a ram linearly movable within the bore of the sleeve the ram including a ram body and at least one drive nut mounted on the ram body, the at least one drive nut arranged on the ram body for threaded engagement with the drive screw; and
    wherein rotation of the sleeve in a first rotational direction disengages the at least one drive nut from the drive screw.

2. The actuator of claim 1, further comprising a first input drive device, the first input drive device mechanically coupled to the drive screw to rotate the drive screw about the longitudinal axis.

3. The actuator of claim 2, further comprising a second input drive device, the second input drive device mechanically coupled to the sleeve to rotate the sleeve about the longitudinal axis independently from rotation of the drive screw.

4. The actuator of claim 1, wherein the sleeve has a radially inner facing cam surface, wherein the at least one drive nut has a radially outer facing cam surface, and wherein the radially inner facing surface and the radially outer facing surface are in slidable contact with one another.

5. The actuator of claim 4, wherein at least one drive nut includes a plurality of drive nuts, wherein the plurality of drive nuts are mounted to the ram body equally spaced from one another.

6. The actuator of claim 5, wherein each drive nut of the plurality of drive nuts has a first side and a second side, wherein the radially outer facing surface is disposed on the first side, and wherein the second side is threaded.

7. The actuator of claim 6, wherein each one of the plurality of drive nuts is biased against the radially inner facing cam surface of the sleeve by a biasing element.

8. The actuator of claim 7, wherein the biasing element is a leaf spring.

9. The actuator of claim 1, wherein the ram includes at least one keyway formed on an exterior of the ram body, and wherein the housing includes at least one key, the at least one key received by the at least one keyway.

10. An actuator, comprising:
    a housing defining a longitudinal axis;
    a sleeve rotatably mounted within the housing, the sleeve defining a bore therethrough;
    a drive screw rotatably mounted within the housing, the drive screw disposed within the bore of the sleeve;
    a ram linearly movable within the bore of the sleeve the ram including a ram body and at least one drive nut mounted on the ram body, the at least one drive nut arranged on the ram body for threaded engagement with the drive screw;
    wherein the at least one drive nut has a radially outer facing cam surface; and
    wherein the sleeve has a radially inner facing cam surface, wherein the radially outer facing cam surface and the radially inner facing cam surface are in slidable contact with one another.

11. The actuator of claim 10, further comprising a first input drive device, the first input drive device mechanically coupled to the drive screw to rotate the drive screw about the longitudinal axis.

12. The actuator of claim 11, further comprising a second input drive device, the second input drive device mechanically coupled to the sleeve to rotate the sleeve about the longitudinal axis independently from rotation of the drive screw.

13. The actuator of claim 10, wherein at least one drive nut includes a plurality of drive nuts, wherein the plurality of drive nuts are mounted to the ram body equally spaced from one another.

14. The actuator of claim 13, wherein each drive nut of the plurality of drive nuts has a first side and a second side, wherein the radially outer facing surface is disposed on the first side, and wherein the second side is threaded.

15. The actuator of claim 14, wherein each one of the plurality of drive nuts is biased against the radially inner facing cam surface of the sleeve by a biasing element.

16. An actuator, comprising:
 a housing defining a longitudinal axis;
 a sleeve rotatably mounted within the housing, the sleeve defining a bore therethrough;
 a drive screw rotatably mounted within the housing, the drive screw disposed within the bore of the sleeve;
 a ram linearly movable within the bore of the sleeve, the ram selectively mechanically coupled to the drive screw; and
 wherein the sleeve is rotatable to a first position and a second position, wherein in the first position, the ram is mechanically coupled to the drive screw and wherein the second position, the ram is disengaged from the drive screw.

17. The actuator of claim 16, wherein the ram includes a ram body and at least one drive nut mounted thereon, the at least one drive nut mechanically coupling the ram to the drive screw.

18. The actuator of claim 17, wherein the sleeve has a radially inner facing cam surface, wherein the at least one drive nut has a radially outer facing cam surface, and wherein the radially inner facing surface and the radially outer facing surface are in slidable contact with one another.

19. The actuator of claim 18, wherein at least one drive nut includes a plurality of drive nuts, wherein the plurality of drive nuts are mounted to the ram body equally spaced from one another.

20. The actuator of claim 19, wherein each drive nut of the plurality of drive nuts has a first side and a second side, wherein the radially outer facing surface is disposed on the first side, and wherein the second side is threaded, wherein each one of the plurality of drive nuts is biased against the radially inner facing cam surface of the sleeve by a biasing element, wherein the biasing element is a leaf spring.

* * * * *